US009912797B2

(12) United States Patent
Yliaho et al.

(10) Patent No.: US 9,912,797 B2
(45) Date of Patent: Mar. 6, 2018

(54) AUDIO TUNING BASED UPON DEVICE LOCATION

(71) Applicant: Nokia Corporation, Espoo (FI)

(72) Inventors: Marko Tapani Yliaho, Tampere (FI); Jarmo Antero Hiipakka, Espoo (FI)

(73) Assignee: Nokia Technologies Oy, Espoo (FI)

( * ) Notice: Subject to any disclaimer, the term of this patent is extended or adjusted under 35 U.S.C. 154(b) by 177 days.

(21) Appl. No.: 13/929,043

(22) Filed: Jun. 27, 2013

(65) Prior Publication Data
US 2015/0003634 A1    Jan. 1, 2015

(51) Int. Cl.
*H03G 5/00* (2006.01)
*H04M 1/725* (2006.01)

(52) U.S. Cl.
CPC .... *H04M 1/72522* (2013.01); *H04M 2250/12* (2013.01)

(58) Field of Classification Search
CPC ........... H04R 2430/01; H04R 2420/01; H04R 2499/11; H04S 2400/13; H04S 7/303; H04S 7/302; H03G 1/00; H04M 1/72522; H04M 2250/12
USPC .... 381/103, 57, 104, 56, 314, 107; 455/570, 455/74
See application file for complete search history.

(56) References Cited

U.S. PATENT DOCUMENTS

| | | |
|---|---|---|
| 9,049,983 B1 | 6/2015 | Baldwin |
| 2002/0068537 A1 | 6/2002 | Shim et al. ................. 455/177.1 |
| 2006/0099996 A1 | 5/2006 | Kanai ........................... 455/566 |
| 2011/0086629 A1 | 4/2011 | Simmons et al. ............. 455/418 |
| 2012/0058803 A1* | 3/2012 | Nicholson ............. H04M 1/605 455/570 |
| 2013/0094668 A1* | 4/2013 | Poulsen ................. H03G 3/301 381/107 |
| 2013/0322651 A1* | 12/2013 | Cheever ................... H03G 5/00 381/101 |
| 2013/0332156 A1* | 12/2013 | Tackin ................ H04M 1/6041 704/226 |
| 2014/0099992 A1 | 4/2014 | Burns et al. ............... 455/550.1 |
| 2014/0135058 A1* | 5/2014 | Sanchez ................ H04W 88/02 455/550.1 |

FOREIGN PATENT DOCUMENTS

| | | |
|---|---|---|
| WO | WO-2012/025783 A1 | 3/2012 |
| WO | WO-2012/052803 A1 | 4/2012 |
| WO | WO-2012/090031 A1 | 7/2012 |

OTHER PUBLICATIONS

SoundLevel.pdf, published Mar. 3, 2011, downloadable from website: http://web.archive.org/web/20110303024207/ http://www.sengpielaudio.com/calculator-distance.htm, 6 pgs.
Office Action, U.S. Appl. No. 13/905,695 dated Jun. 14, 2017, 19 pgs.

* cited by examiner

*Primary Examiner* — Vivian Chin
*Assistant Examiner* — Ammar Hamid
(74) *Attorney, Agent, or Firm* — Harrington & Smith

(57) ABSTRACT

An apparatus including at least one sensor configured to sense location of at least one portion of a head of a user relative to the apparatus; at least one processor; and at least one memory having software. The processor and the software are configured to process audio signals based, at least partially, upon output from the sensor.

23 Claims, 21 Drawing Sheets

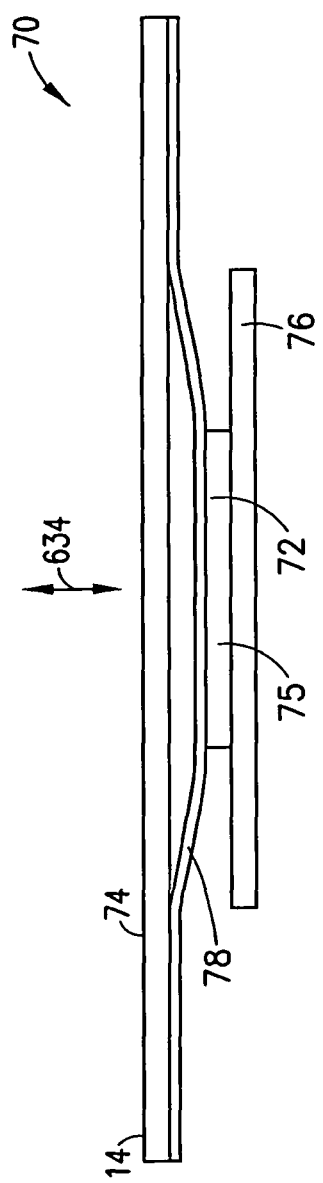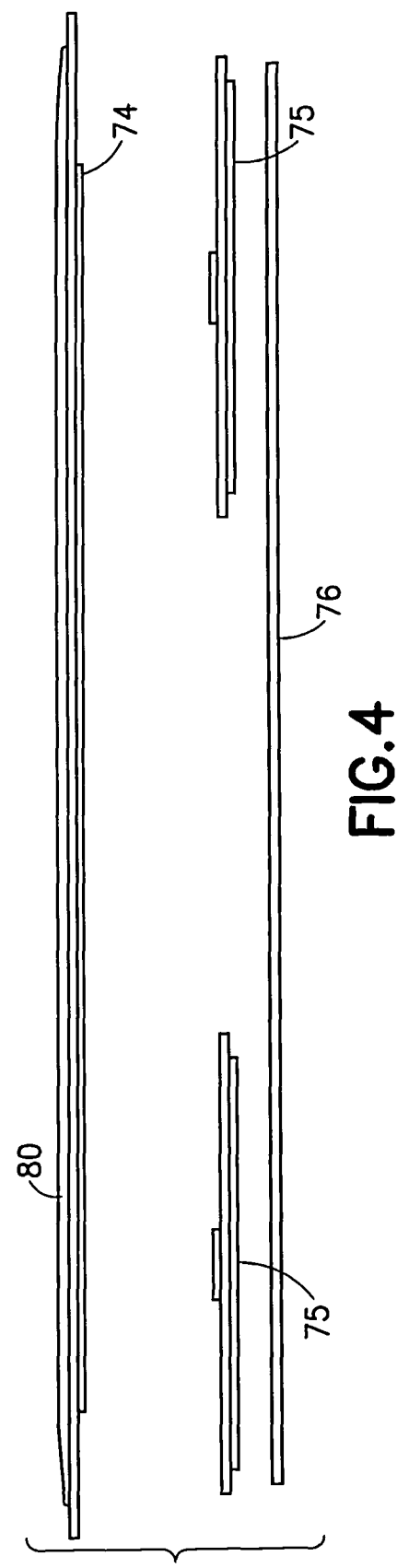

AUDIO TUNING BASED UPON DEVICE LOCATION

BACKGROUND

Technical Field

The exemplary and non-limiting embodiments relate generally to audio tuning and, more particularly, to audio tuning based upon device location.

Brief Description of Prior Developments

Touchscreens are known which use capacitive touch sensors. Audio tuning of an uplink audio signal from a microphone is known.

SUMMARY

The following summary is merely intended to be exemplary. The summary is not intended to limit the scope of the claims.

In accordance with one aspect, an example embodiment is provided in an apparatus comprising at least one sensor configured to sense location of at least one portion of a head of a user relative to the apparatus; at least one processor; and at least one memory comprising software. The at least one processor and the software are configured to process audio signals based, at least partially, upon output from the at least one sensor.

In accordance with another aspect, an example method comprises sensing, by at least one sensor, location of an apparatus relative to at least one portion of a head of a user relative to the apparatus; and processing an audio signal based, at least partially, upon the location sensed by the at least one sensor.

In accordance with another aspect, an example embodiment is provided in a non-transitory program storage device readable by a machine, tangibly embodying a program of instructions executable by the machine for performing operations, the operations comprising determining location of at least one portion of a head of a user relative to an apparatus based upon output from at least one sensor; and processing an audio signal based, at least partially, upon the determined location.

BRIEF DESCRIPTION OF THE DRAWINGS

The foregoing aspects and other features are explained in the following description, taken in connection with the accompanying drawings, wherein:

FIG. 3 is a schematic sectional view of one of the audio display modules shown in FIG. 1;

FIG. 4 is a schematic exploded side view of portion of the apparatus shown in FIG. 1;

DETAILED DESCRIPTION OF EMBODIMENTS

Figure 1:
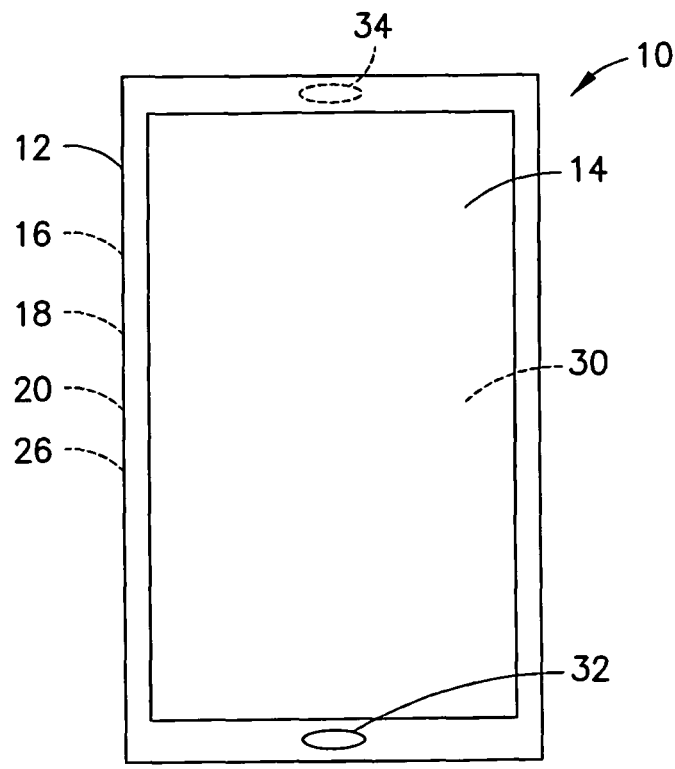
FIG. 1 is a front view of an example embodiment of an apparatus.

Referring to FIG. 1, there is shown a front view of an apparatus 10 incorporating features of an example embodiment. Although the features will be described with reference to the example embodiments shown in the drawings, it should be understood that features can be embodied in many alternate forms of embodiments. In addition, any suitable size, shape or type of elements or materials could be used.

Figure 2:
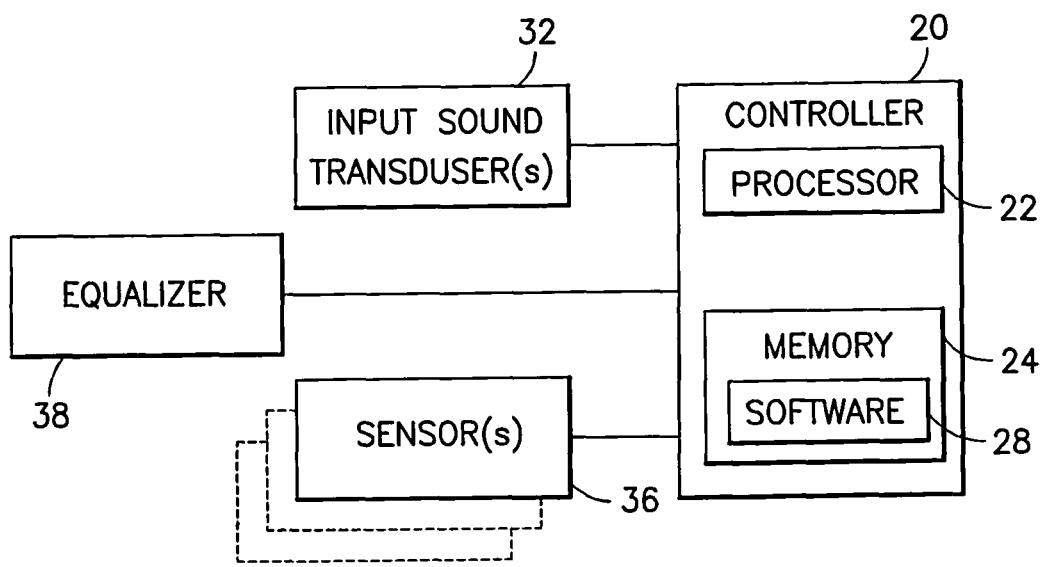
FIG. 2 is a schematic diagram illustrating some of the components of the apparatus shown in FIG. 1.

The apparatus 10 is a hand-held communications device which includes a telephone application. In an alternate example the apparatus might not comprise a telephone application. In the example shown in FIG. 1, the apparatus 10 may also comprise an Internet browser application, camera application, video recorder application, music player and recorder application, email application, navigation application, gaming application, and/or any other suitable electronic device application, such as may be provided on a smartphone or tablet computer for example. Referring to both FIGS. 1 and 2, the apparatus 10, in this example embodiment, comprises a housing 12, a display module 14, a receiver 16, a transmitter 18, a rechargeable battery 26, and a controller 20 which may include at least one processor 22, at least one memory 24, and software 28. However, all of these features are not necessary to implement the features described below. For example, features as described herein may be used in a non-portable apparatus which does not have a battery.

The apparatus 10 also includes at least one speaker and at least one microphone 32. In the embodiment shown in FIG. 1, the speaker is formed by the display module 14 as a panel speaker as further described below. In an alternate example the sound transducer earpiece 34 might be provided rather than a panel speaker.

The receiver 16 and transmitter 18 form a wireless mobile communication interface to allow the apparatus 10 to communicate with a wireless telephone system, such as a mobile telephone base station for example. The wireless mobile communication interface 16, 18 may allow the apparatus 10 to communicate such as by 4G, 4G LTE, 3G, CDMA, etc. for example. However, in an alternate example embodiment the receiver 16 and transmitter 18 might not be provided, such as when the apparatus 10 does not have telephone capabilities. For example, the apparatus 10 might merely be a gaming device or a music/video player. However, for a device having telephone capability, cellular circuit switched telephony or VoIP may be provided for example. So, a cellular system transmitter and receiver are not necessarily needed, such as if the device has only VoIP call functionality. However, even with a device which has VoIP call functionality, the device may have a transmitter and a receiver for Wi-Fi. Internet access for the apparatus 10 might be provided by a short range communications system through the television console or a wireless WLAN for example. These are only some examples, and should not be considered as limiting.

Referring also to FIG. 3, the display module 14 forms a speaker 70 comprising a vibrating element 72 and a display element 74. The display module is, thus, able to provide an "Audio Display" or "panel speaker" concept which has been developed by Nokia Corporation. In the Audio Display concept, generally, at least one piezo actuator (or other vibrating element) may be suitably coupled to the display module for sound generation so that the display module can be used as a conventional display, but further for sound generation and perhaps tactile feedback. In alternative embodiments of Audio Display integrations, the piezo actuator may be coupled to the display window (in front of the display module) for sound generation. There are various ways of reproducing sound waves in the direction of the display module. The audio display module 14 in this example embodiment is configured to function as both a display and as a speaker or sound transducer. However, in an alternate example embodiment, such as when the earpiece sound transducer 34 is provided, a panel speaker might not be provided.

The display element 74, in this example, is a touch screen display which functions as both a display screen and as a user input. The display element 74 may comprise a touch input device (TID) 30, such as a capacitive sensor for example. However, features described herein may be used in a display which does not have a touch, user input feature. Alternatively, another example may comprise an apparatus which has a touchpad or touch-panel which is not part of an electronic display screen. The electronic circuitry inside the housing 12 may comprise a printed wiring board (PWB) having components such as the controller 20 thereon. The circuitry may include a sound transducer provided as the microphone 32.

In this example the vibrating element 72 comprises a piezoelectric member 75 connected to a printed circuit board 76. The display element 74 is an electronic display. A member 78 connects the piezoelectric member 75 to the back side of the display element 74. The piezoelectric member 75 is flexed by the printed circuit board 76. This causes the piezoelectric member 75 to move the electronic display 74 in and out as illustrated by arrow 634 to generate sound waves from the front of the electronic display 74.

Referring also to FIG. 4, in this example the apparatus comprises two of the piezoelectric member 75 connected to the back side of the display element 74. The piezo actuators may be directly coupled to the display module or might not be directly coupled to the display module. The speaker in a broader definition may comprise additional element(s). For example, a speaker may have a plate under the display module where the piezos may be used to actuate the plate so that the plate could move/vibrate the display in a z-direction (634). A window plate 80 may be provided on the front face of the display element 74. In an alternate example embodiment, rather than a piezoelectric member, the vibrating element may comprise vibrating of the display with a dynamic actuator such as speaker or vibra. Thus, features as described herein are not limited to using a piezoelectric actuator.

The audio display module 14 is connected to the controller 16. The controller 16 is configured to control display of images on the display element 74, and also control generation of sound from the audio display module 14. The source of the images and sounds may comprise any suitable source (s), such as applications, video, data from the Internet, television signals, etc. The audio signals sent to the audio display module 14 may be formed or controlled by the controller. The audio signals may be telephone voice signals from a telephone conversation. In this example the audio display module 14 is configured to provide an electronic display feature, an audio speaker feature and a haptic feedback feature. However, the haptic feedback feature might not be provided in an alternate embodiment.

Referring back to FIG. 2, the apparatus 10 comprises one or more sensors 36 and at least one audio processor such as the equalizer 38. The equalizer 38 is connected to the controller 20 and is configured to receive input from the input sound transducer(s) 32. The sensor 36 in this example comprises the touch input device (TID) 30 of the display module 14. However, in an alternate example the sensor(s) may alternatively or additionally comprise another sensor(s) as further described below.

Figure 5:
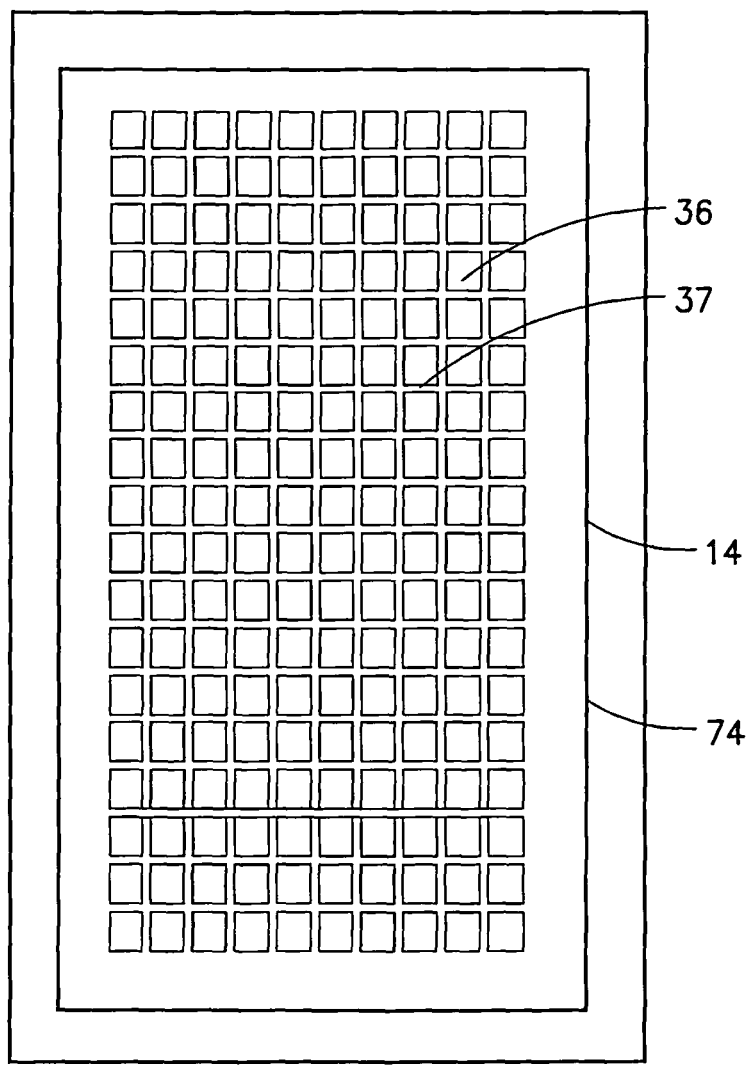
FIG. 5 is a schematic front view illustrating capacitive sensors in the apparatus for detecting a user's ear.

Referring also to FIG. 5, in this example embodiment the sensor 36 of the apparatus 10 comprise capacitive sensors 37 provided as a layer on the display element 74, such as transparent electrically conductive material, Indium Thin Oxide (ITO) for example. The sensor 36 may be part of the touch input device (TID) 30 for example. For the embodiment of FIG. 5, the capacitive sensors 37 may be used for detecting ear location using capacitive touch sensing.

Figure 7:
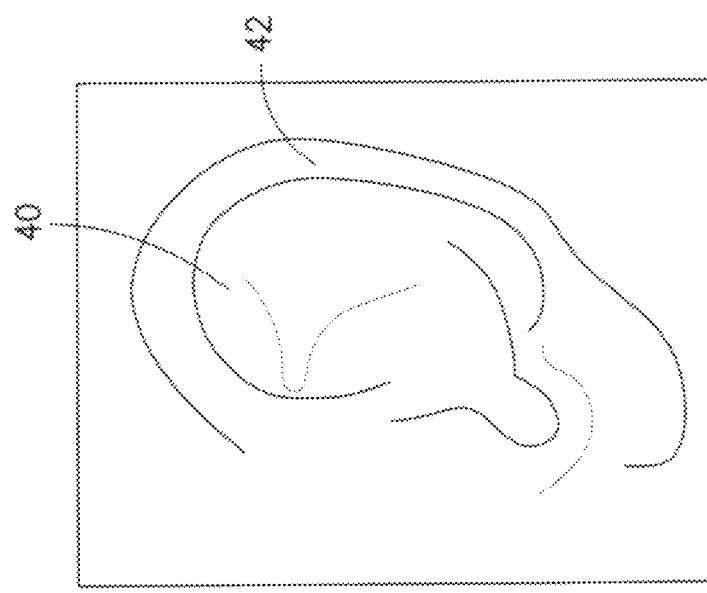
FIG. 7 illustrates a user's ear including the earlobe and ear canal.
Figure 6:
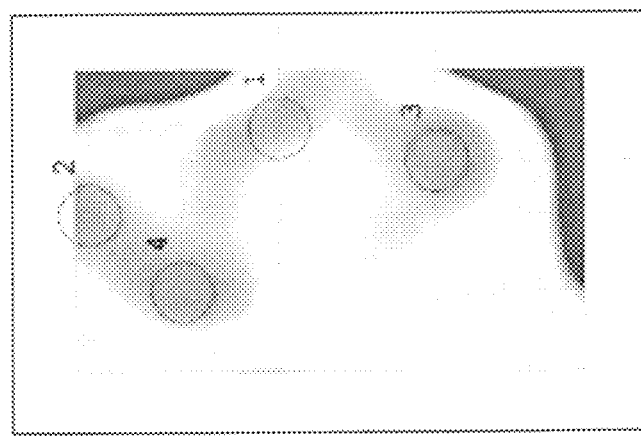
FIG. 6 illustrates an example sensor image presented as a heat map for a user's ear sensed by the capacitive sensors of the touch screen of the apparatus shown in FIG. 1.

Referring also to FIGS. 6 and 7, the image in FIG. 6 illustrates a high-sensitive touch sensor result by the sensor 36 of an ear 42 of a user 40, illustrated by FIG. 7, when the display module 14 is gently put over the ear 42. The circles and numbers in FIG. 6 indicate an algorithm trying to find out where fingers (holding the apparatus 10) might be, and are not relevant. FIG. 6 shows how a high sensitive touch sensor sees the ear 42 in the middle of the display when the phone is held vertically. Note that "vertically" here means relative to a user's head and not to the ground. From sensor image, an approximate distance and angle to an average user's mouth can be concluded. This "average" user's head dimensions may be recorded in a lookup table for example. Multiple lookup tables may be provided corresponding to different head shapes and sizes. For an apparatus which has more than one lookup table, the user and/or the apparatus may be able to select the appropriate lookup table for that person's particular size/shape head.

Figure 8:
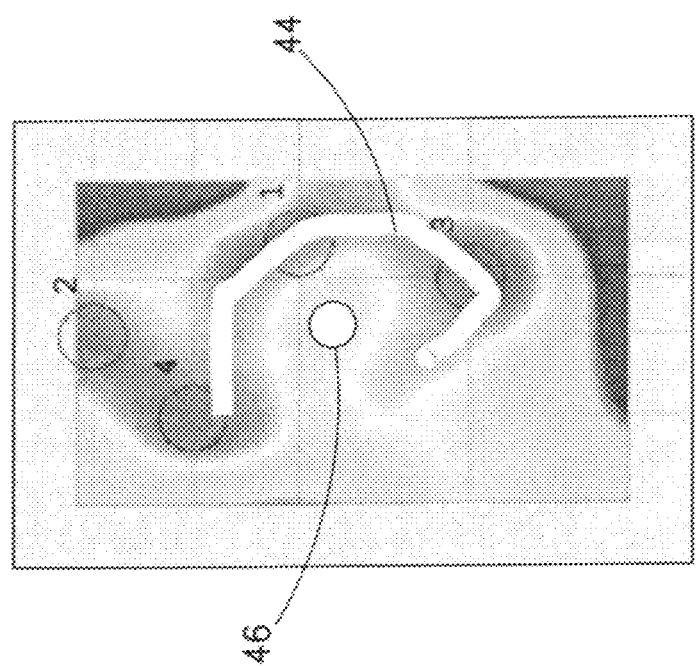
FIG. 8 is the image of FIG. 6 illustrating location of the earlobe and ear canal determined by an algorithm.

Referring also to FIG. 8, the software may be configured to determine the location and orientation of the ear 42 on the display based upon the touch sensor result. Detection of the ear may use any suitable algorithm based upon the input from the sensor 36. Machine vision methods may be used to recognize the shape of the ear. In one example the shape of the earlobe, marked with white line 44, may be detected together with the auditory canal, marked with white circle 46, inside the earlobe. Also, the area of the cheek of the user that is close to the sensor 36 may be helpful in determining location and orientation of the apparatus 10 relative to the user's head. The detection speed may be determined by the sampling rate of the sensor, such as about 100 Hz for example. Thus, a new image for recognition may be obtained about every 10 ms. The calculation of the ear shape itself is not time consuming. In one example embodiment and method the parameter adjustment will not take more than half a second, and this is clearly enough time for processing of the input audio from the input sound transducer 32 to be adapted to the position change(s) of the apparatus 10 relative to the user's head. Different people have different size and shape ears. The controller 20 may have software to allow the apparatus to be programmed to learn the shape of the user's ear, or for the user to train the shape of the user's ear, and store that information in memory 24. This information may be used to ensure better reliability and perhaps faster location/orientation recognition.

Measured capacitance of the technology used in this example is a 16-bit value for each pixel and in the figures (such as the one shown in FIG. 8) that 16-bit value is scaled to an 8-bit value. The figures do not show the full resolution of sensitivity. Even more accurate images for ear location and orientation recognition processing may be obtained with a more sensitive touchscreen capacitive sensor. Even if the user presses the device hard against the ear and the earlobe flattens, the auditory canal hole and the area around the earlobe will not be touching the screen, and that distance is detectable and the earlobe shape is recognizable.

In FIGS. 6 and 8 the sensing by the touchscreen capacitive sensor 36 is illustrated equivalent to a heat map. The "hotter" the color, the closer an object is to the display. In practice red means physical touch while yellow is "just above the display" and green is "farther away from the display". The technology available at the moment is capable of detecting objects between about 0-5 centimeters above the top of the display.

Figure 9:
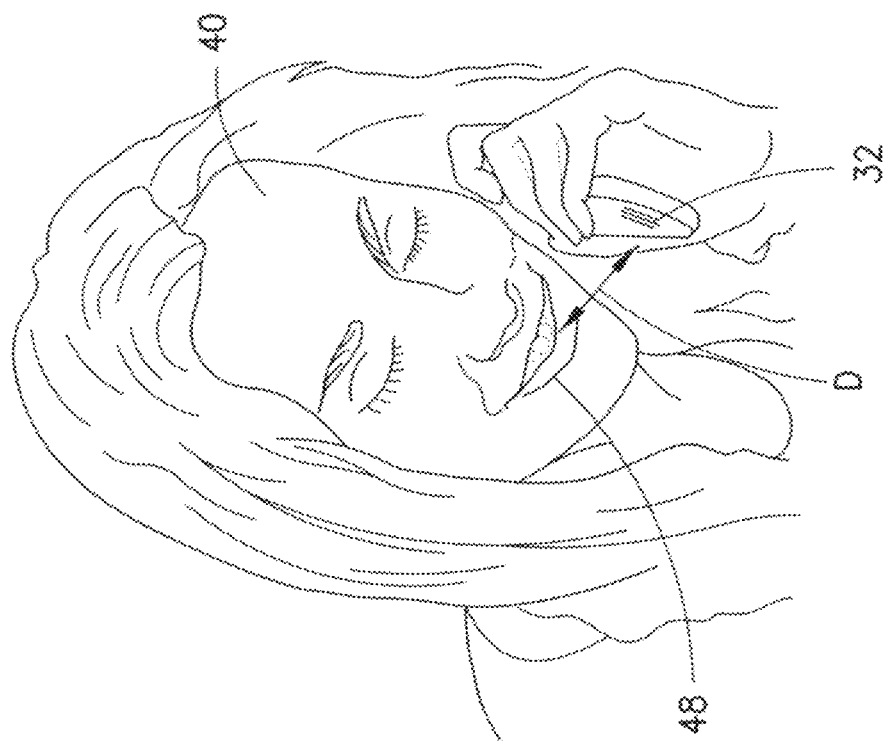
FIG. 9 is view showing a user holding the apparatus shown in FIG. 1 at the user's head.

The detection algorithm may be continuous or mode based for example. Referring also to FIG. 9, a continuous detection algorithm may detect the distance D (and/or relative x, y, z) of the device's microphone(s) 32 from the user's mouth 48 continuously and passes that information for uplink audio processing algorithms. The accuracy of this measurement is difficult to estimate, but a fair estimate is that 1 cm accuracy may be reached.

A mode based algorithm may define quantized positions for example:
high/normal/low for the angle relative to the user's head
top/mid/bottom for the ear location on the device y-axis
closed/open for the angle between the cheek and the phone The algorithm may know some reliability value for the detection. Sensory data may be used for adjusting the tuning parameters only if a certain threshold value is exceeded for example. The definition of a correct threshold value may be part of the audio tuning process of the apparatus 10. The reliability value may be defined, for example, by the accuracy of the ear lobe detection. The more clear the shape of the ear lobe, the better the reliability value may be.

The algorithm may be used to improve audio quality, and it may be used merely if the threshold value is exceeded. If the portion(s) of the user's head (such as the ear and/or cheek) is not detected accurately enough, then default tuning values (the ones that would be used without this feature) may be used as a default.

The apparatus may comprise a software component that continuously monitors sensory data during a phone call, and detects the relevant parameters (location data) as either continuous data or modes as described above. The apparatus may comprise a software component that interprets the location data and converts that to audio tuning values. The audio tuning values may be updated during a call without artifacts. This is unlike conventional mobile telephone implementations where audio tuning values are static and defined during the tuning process, such as during a technical step of compilation by software for example.

In the past, uplink audio tuning of audio signals from a microphone (such as microphone 32), based upon acoustic sound received by the microphone, were done based on assumptions about how users preferably or expectedly hold the apparatus. Features as described herein may be used in telephony uplink audio tuning based on determined actual real-time device location and distance relative to a user's mouth (or at least a portion(s) of the user's head). Telephony audio tuning is not a straight forwarded task. Different users hold devices (such as mobile handsets) differently. Features as described herein may be used to change audio tuning of audio from the microphone based upon sensed location and orientation of the apparatus relative to the user's head. Features may utilize sensory data (for example a touch sensor) to define how the user holds the device relative to the user's mouth, and use different audio uplink tunings depending on that information.

Figure 10:
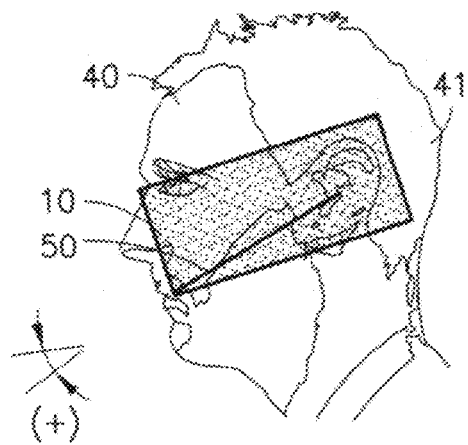
FIGS. 10-12 illustrate different angular positions of the apparatus of FIG. 1 relative to a user's head.
Figure 11:
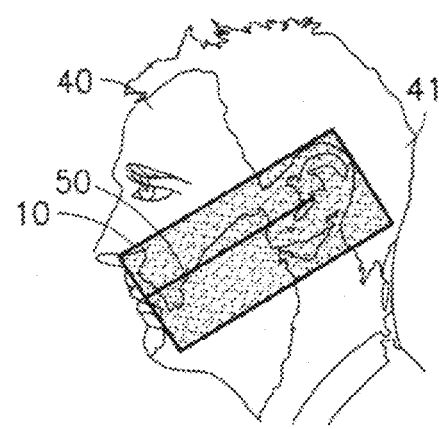
Figure 12:
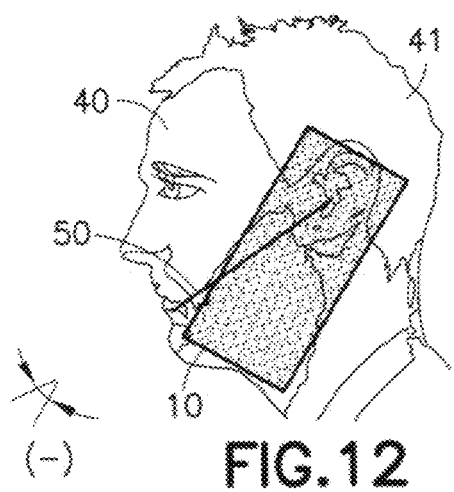

Referring also to FIG. 10-12, one information which may be used is the angle of the apparatus (box 10) relative to the angle between the ear and the mouth (line 50) of a user's head 41. FIGS. 11 and 11 shows a normal position of the apparatus 10. FIG. 10 shows a high position of the apparatus 10 where the end having the microphone 32 is elevated versus the normal position. FIG. 12 shows a low position of the apparatus 10 where the end having the microphone 32 is located down versus the normal position.

This angle (illustrated by the line versus the box) can be defined, for example, by utilizing the touch sensor to detect the ear. As the exact length of the apparatus 10 and the sensor(s) 36 on the apparatus 10 is known, that will tell how the apparatus 10 is held relative to the user's head and, thus, approximately relative to the user's mouth. The age of the user may also be used to gage the distance of the mouth to the user's ear based upon the size of the user's ear (an ear may get larger as people age). Note that features as described herein are not limited to using a capacitive touch sensor or any single sensor in general to make this definition.

Figure 13:
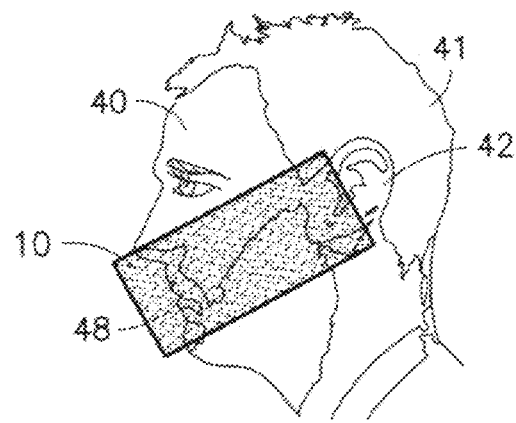
FIGS. 13-15 illustrate different distance forward and backward positions of the apparatus of FIG. 1 relative to a user's head.
Figure 14:
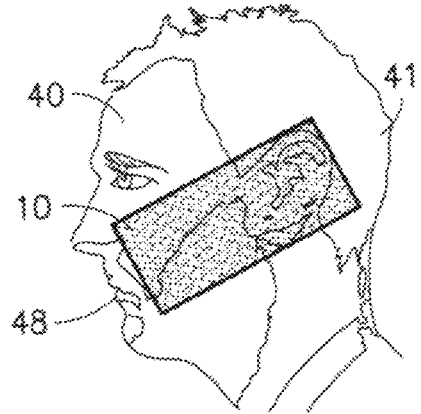
Figure 15:
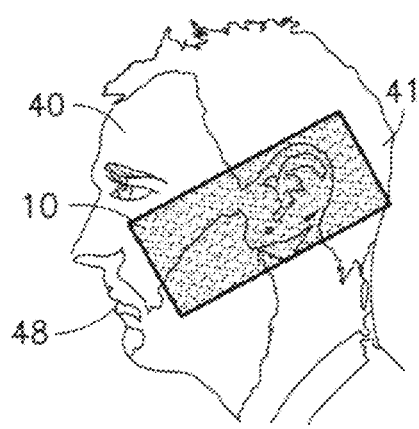

Referring also to FIG. 13-15, one information which may be used is the distance of the apparatus (box 10) from the mouth 48 of the user 40. The distance may vary relatively greatly if the apparatus has a panel speaker as the earpiece instead of the conventional earpiece 34 with a fixed location. This distance can be determined, for example, by utilizing touch sensor 36 to detect the location of the ear 42 on the x, y location of the display 14. As the exact length of the apparatus 10 and the location of the microphone(s) on the apparatus 10 are known, that will approximately tell how the phone is held relative to the user's mouth 48.

Figure 17:
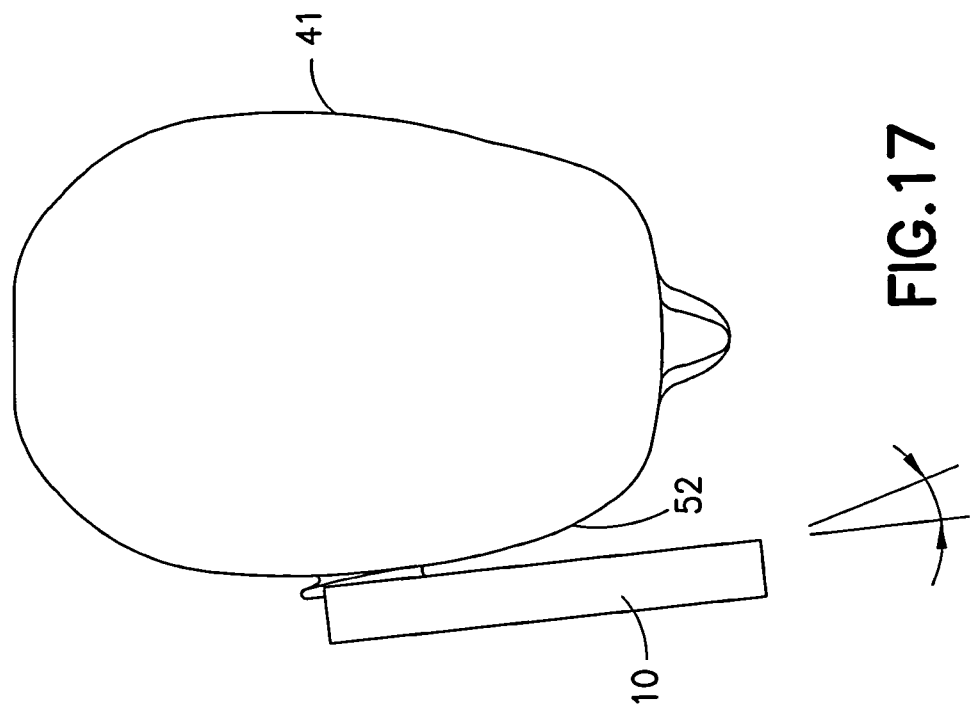
FIGS. 16-17 illustrate different angle open and closed positions of the apparatus of FIG. 1 relative to a user's head.
Figure 16:
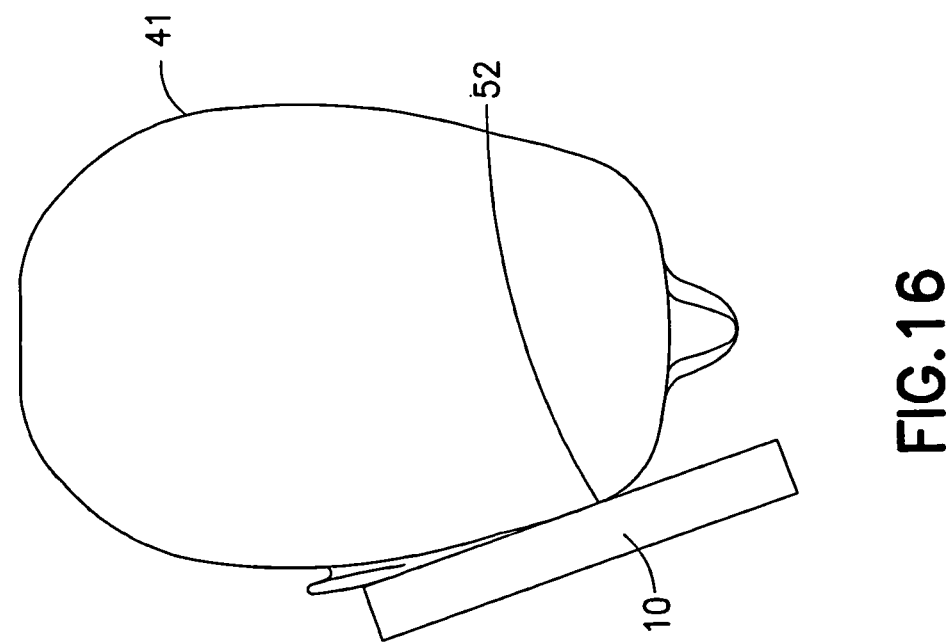

Referring also to FIG. 16, one information which may be used is the angle of the apparatus 10 (box 10) relative to the user's "cheek line" or cheek 52. This angle may be defined, for example, by utilizing the touch sensor 36 to detect the angle of the ear on the sensor 36. As the exact length of the apparatus and the location of the sensor 36 are known, that will tell how the phone is approximately held relative to the user's mouth. FIG. 16 illustrates a closed position with a small angle close to zero. FIG. 17 illustrates an open position with a relatively larger angle.

Figure 18:
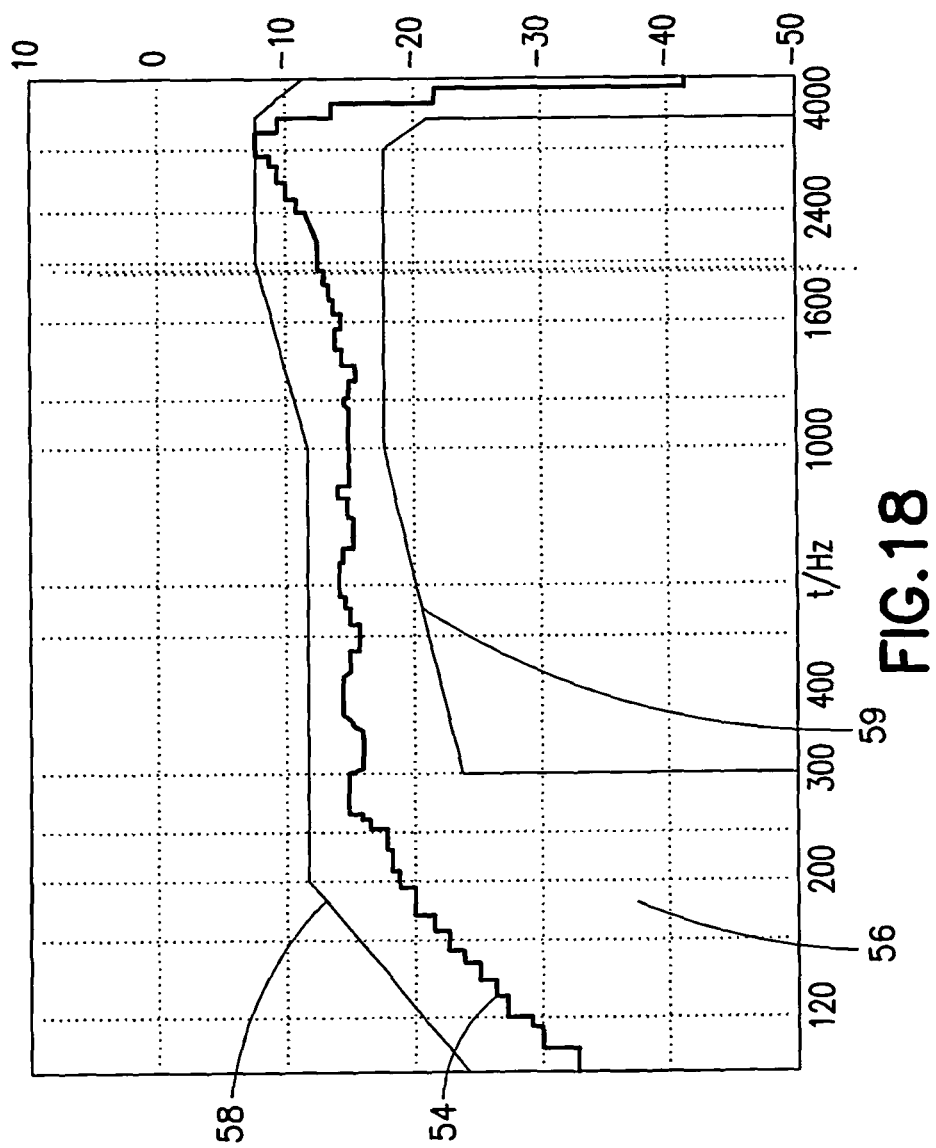
FIGS. 18-21 are graphs illustrating different audio uplink results from different positions of the apparatus relative to the user's head.

FIG. 18 is a graph illustrating sensitivity of the microphone 32 when the apparatus 10 is in the nominal position shown in FIGS. 11, 14 and 16. Conventional static audio tunings have been done by the apparatus 10 to the audio signal from the microphone 32 so that the resultant response 54 fits the mask 56 defined by the upper and lower limits 58, 59.

Figure 19:
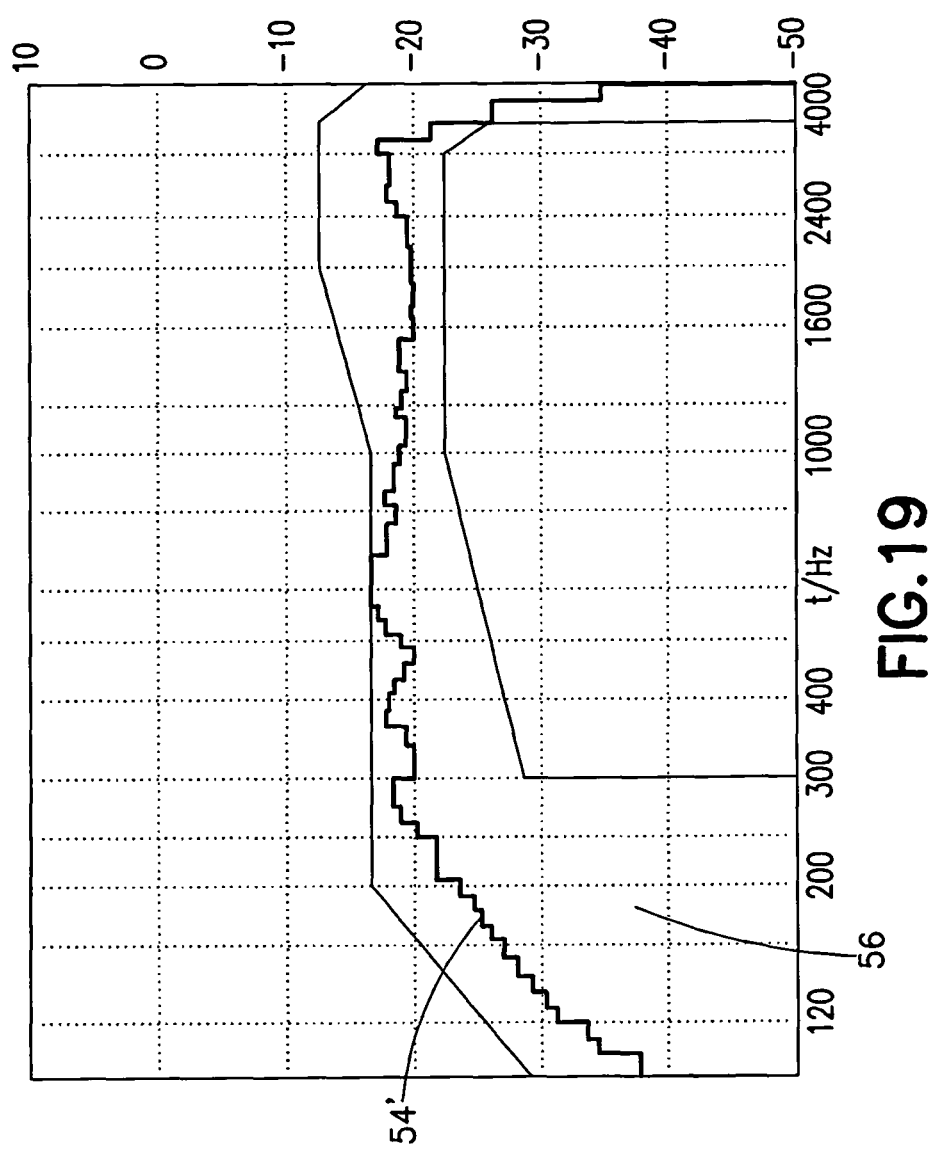

FIG. 19 is a graph illustrating sensitivity of the microphone 32 when the apparatus 10 is in the low position shown in FIGS. 12 and 16. The conventional audio tunings made will result to the response 54' fitting the mask also in this position. The response fits the window, but the sound level has decreased.

Figure 20:
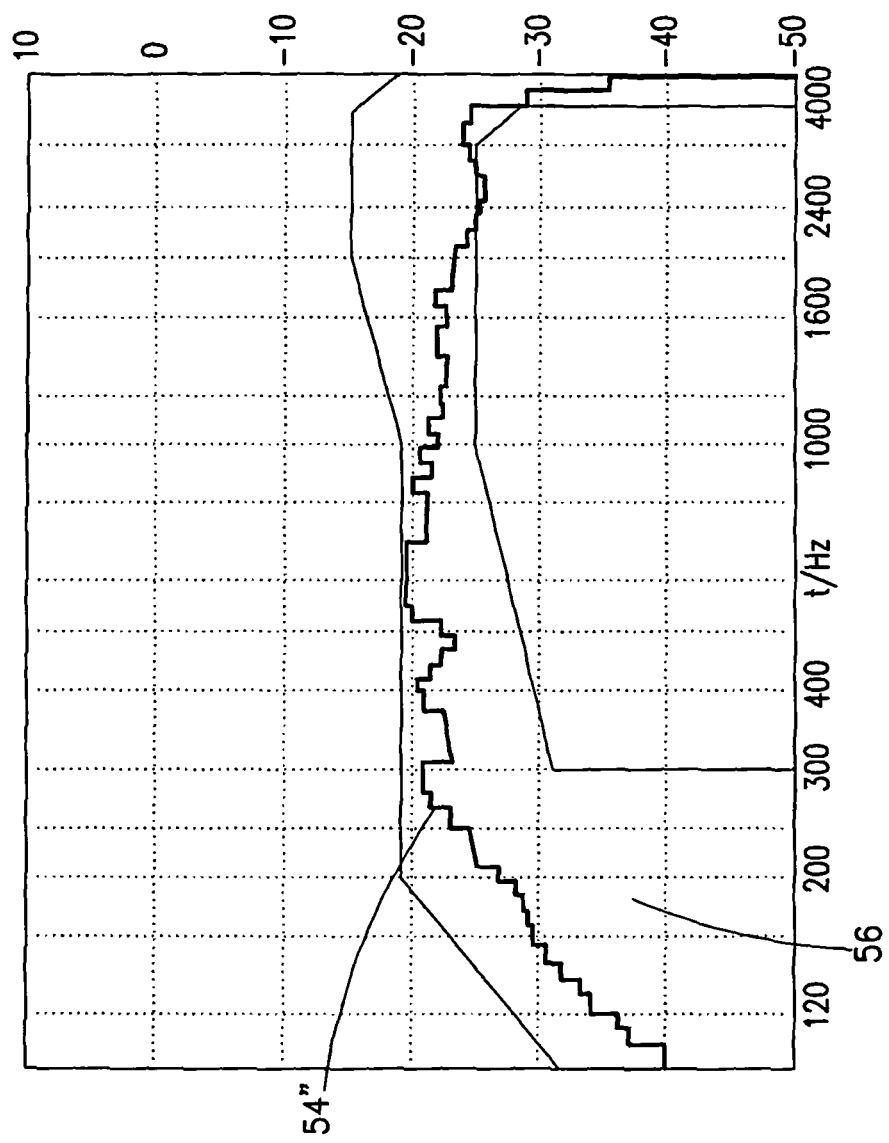

FIG. 20 is a graph illustrating sensitivity of the microphone 32 when the apparatus 10 is in the open position (combination of FIGS. 11, 14 and 17). In this position the response 54" will not fit the mask 56 anymore with a static conventional tuning, and additional tuning is desired to be provided to fit the mask. Without additional tuning the higher frequencies would be attenuated.

Figure 21:
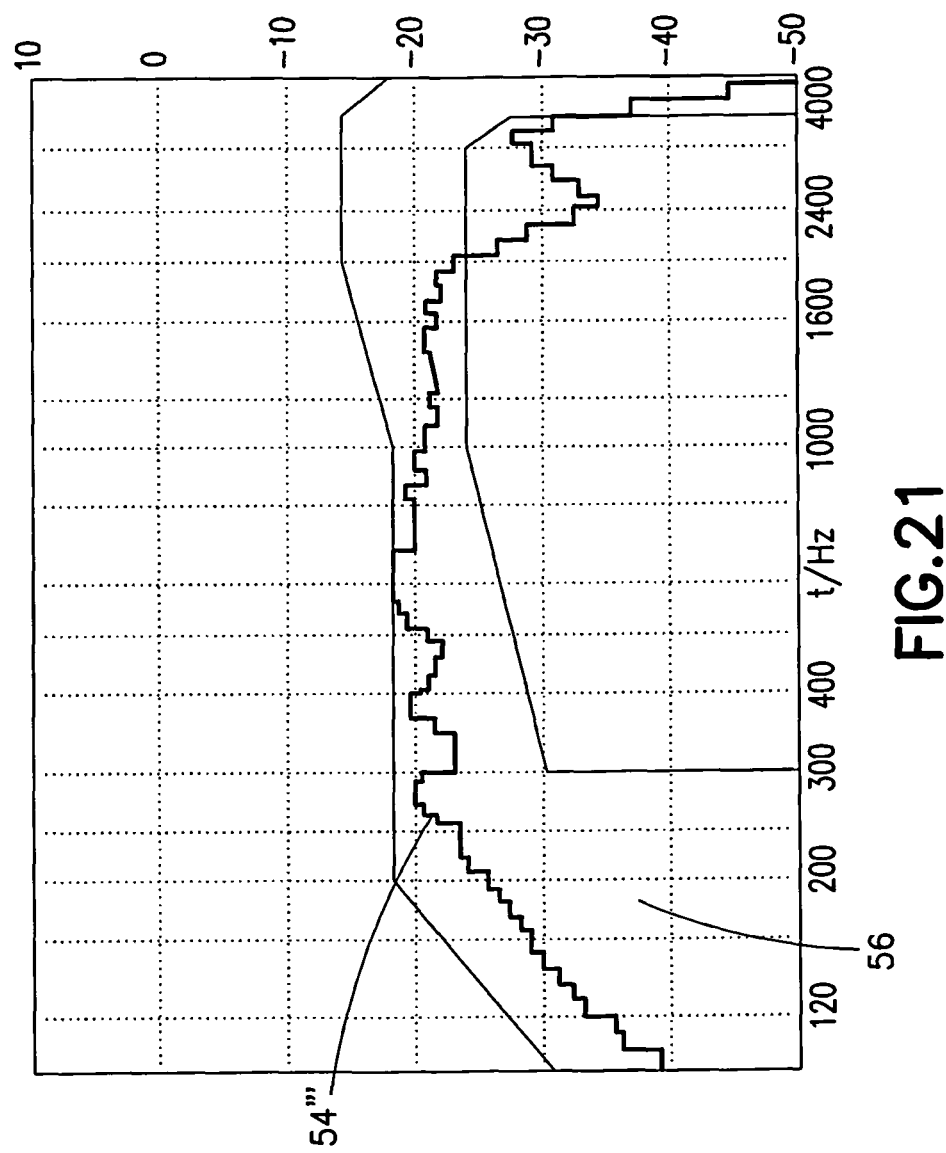

FIG. 21 is a graph illustrating sensitivity of the microphone 32 when the apparatus 10 is in the low, open position (combination of FIGS. 12, 14 and 17). In this position the response 54''' does not fit the mask 56 anymore unless additional tuning is provided. The higher frequencies would be attenuated without additional tuning (even more than in just open position corresponding to FIG. 20).

Uplink sensitivity may depend highly on the location of the microphone 32 relative to the mouth 48. With features as described herein, once the apparatus recognizes or determines the location and orientation of the apparatus 10 corresponding to FIGS. 20 and 21, the apparatus 10 applies additional tuning, such as by using the equalizer 38 for example, to prevent attenuation of the audio signal. In order to compensate for the loss of the higher frequencies (as illustrated by the example in FIGS. 20 and 21), equalization could be processed to get the response to more flat. The equalization parameters may depend on the location of the microphone which is determined using, for example, input from the touch sensor 36.

Figure 22:
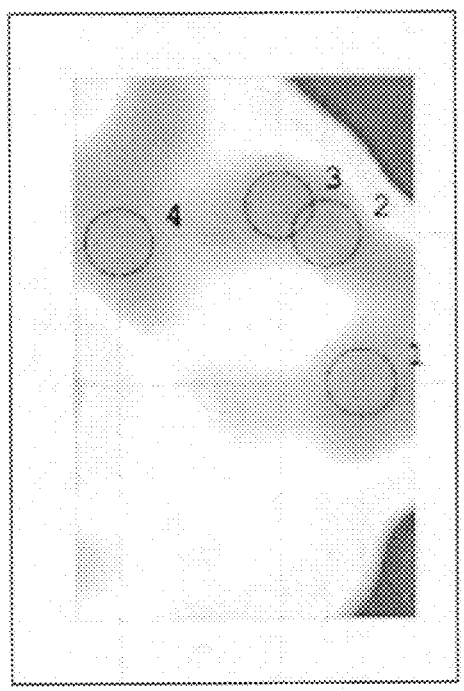
FIG. 22 is a heat map illustration similar to FIG. 6 for the apparatus position relative to the user's head shown in FIG. 15.
Figure 23B:
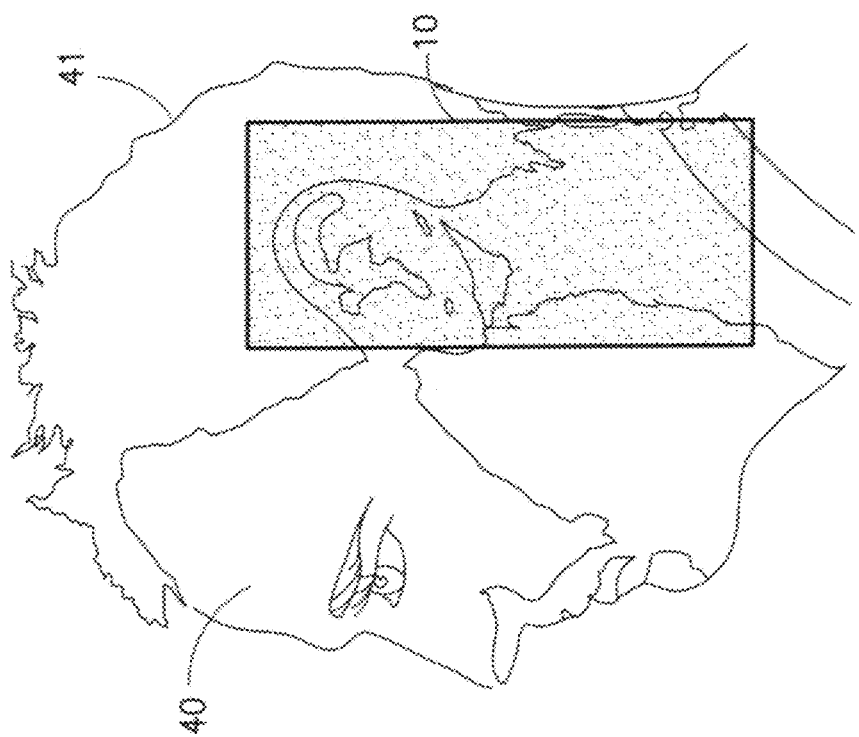
FIG. 23A is a heat map illustration similar to FIG. 6 for the apparatus position relative to the user's head shown in FIG. 23B.
Figure 23A:
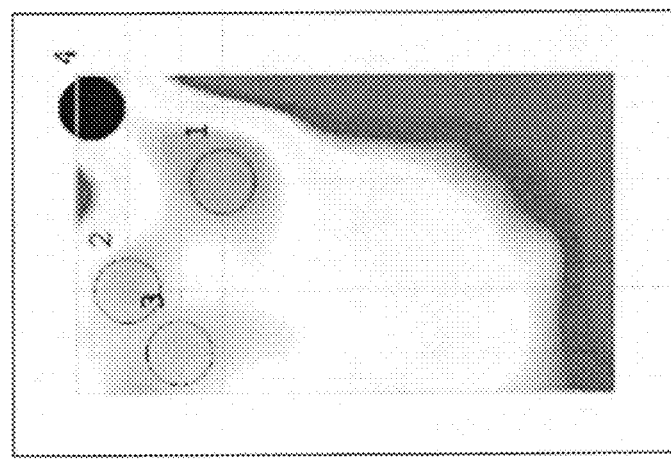
Figure 24B:
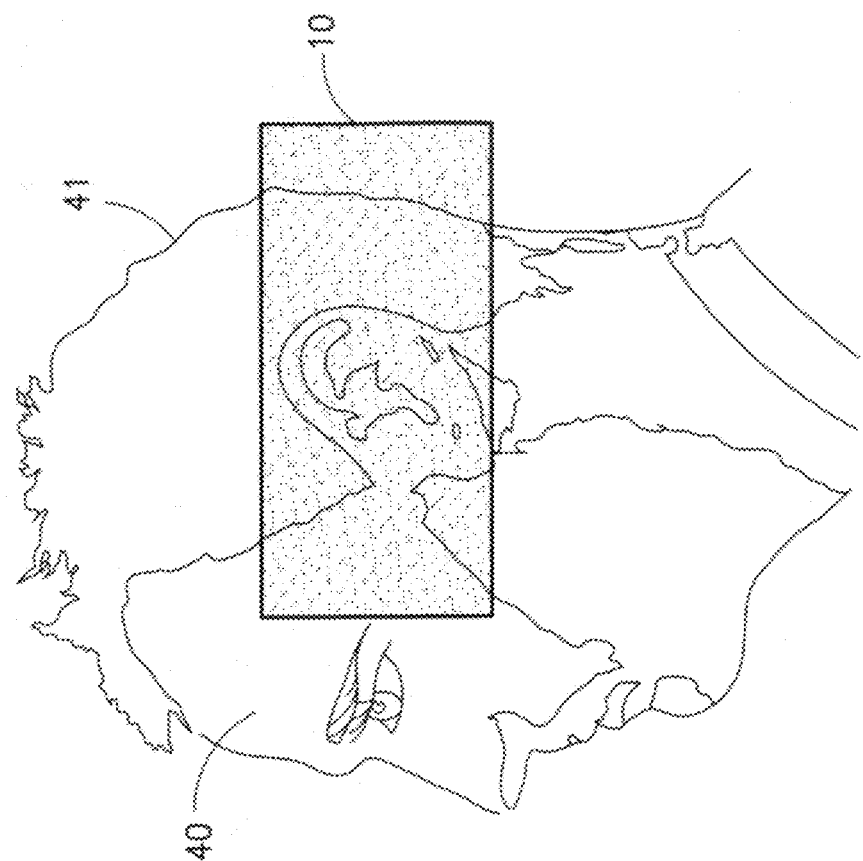
FIG. 24A is a heat map illustration similar to FIG. 6 for the apparatus position relative to the user's head shown in FIG. 24B.
Figure 24A:
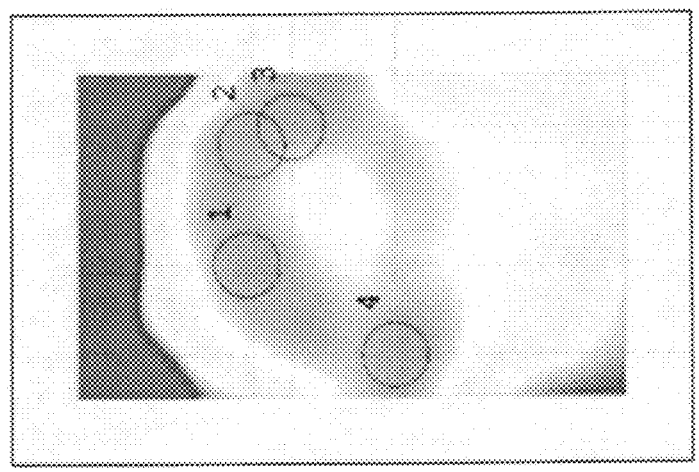
Figure 25B:
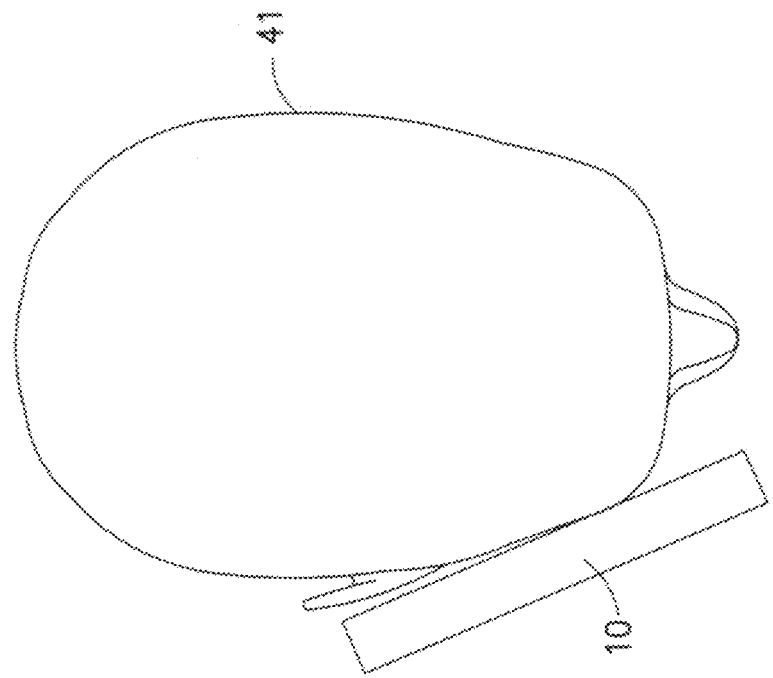
FIG. 25A is a heat map illustration similar to FIG. 6 for the apparatus position relative to the user's head shown in FIG. 25B.
Figure 25A:
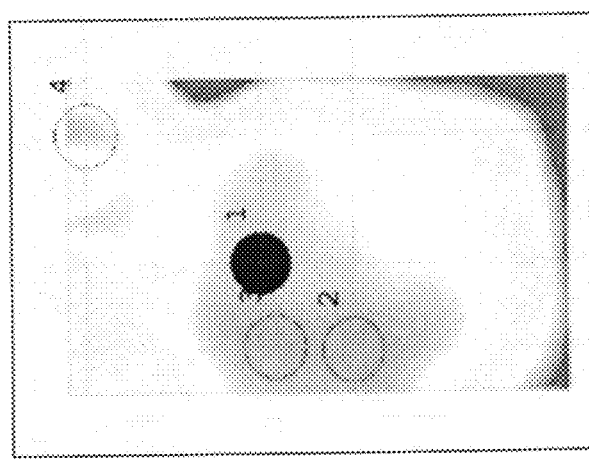
Figure 26B:
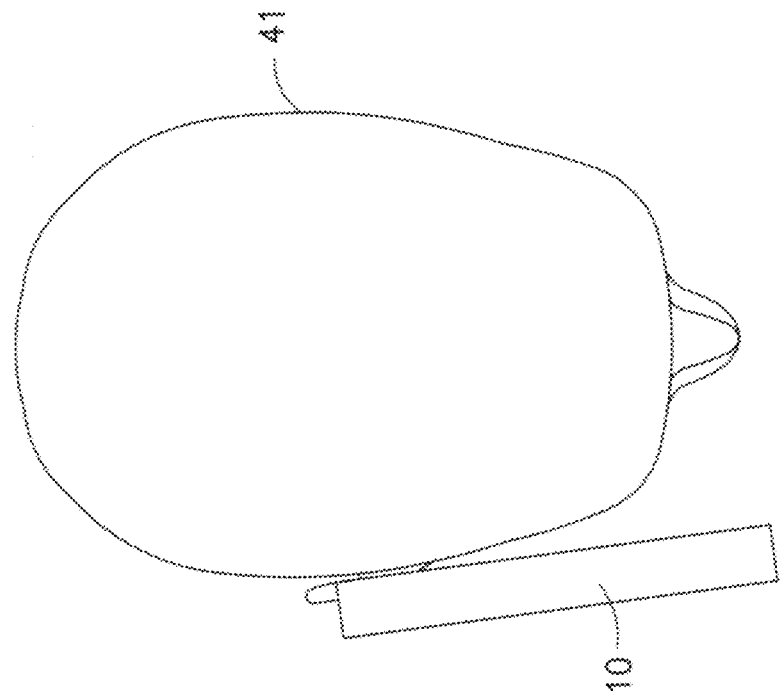
FIG. 26A is a heat map illustration similar to FIG. 6 for the apparatus position relative to the user's head shown in FIG. 26B.
Figure 26A:
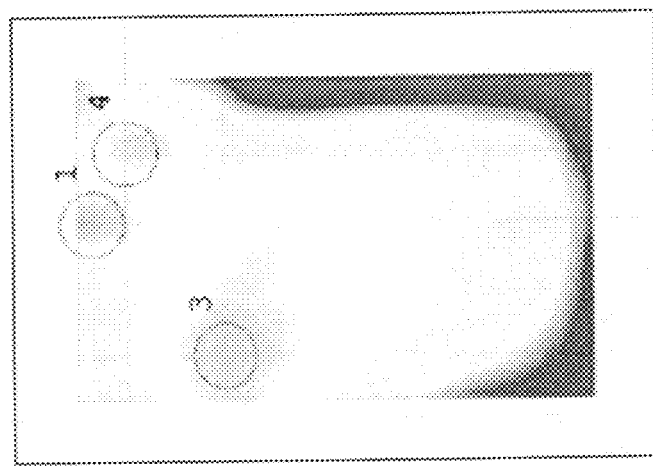
Figure 27B:
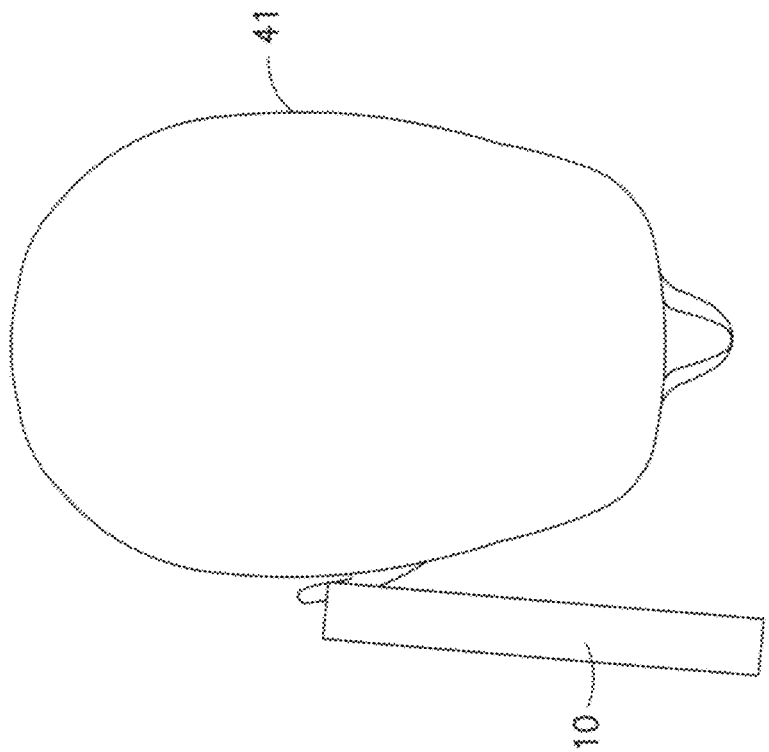
FIG. 27A is a heat map illustration similar to FIG. 6 for the apparatus position relative to the user's head shown in FIG. 27B.
Figure 27A:
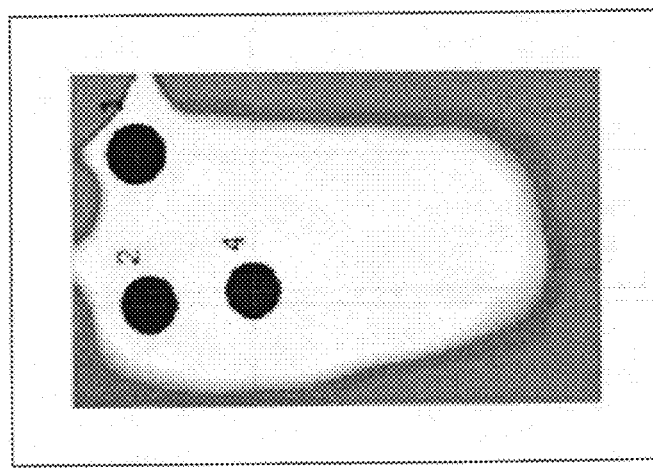
Figure 28B:
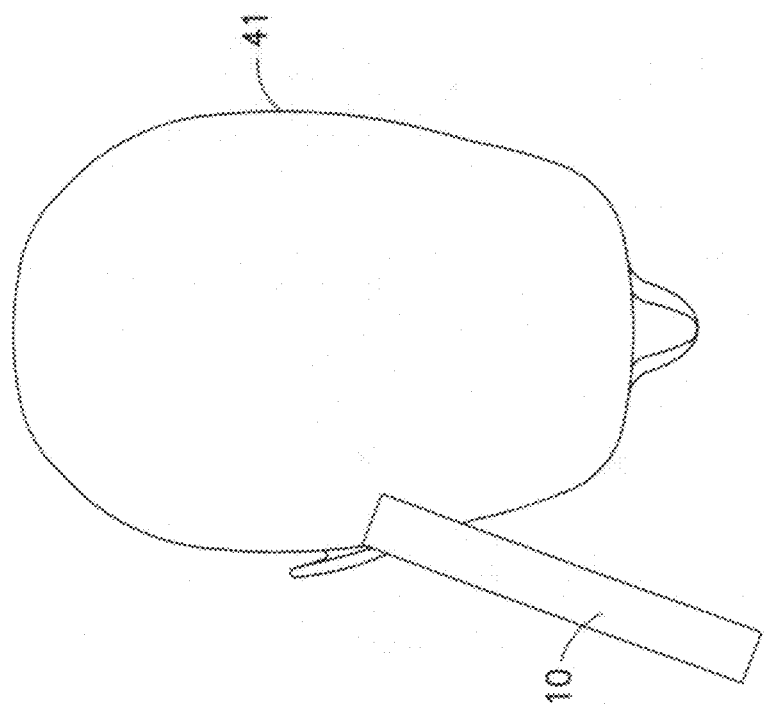
FIG. 28A is a heat map illustration similar to FIG. 6 for the apparatus position relative to the user's head shown in FIG. 28B.
Figure 28A:
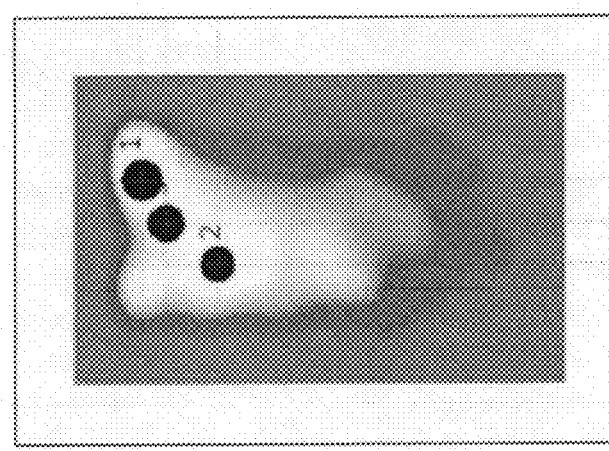

FIG. 6 shows how a high sensitive touch sensor may see the ear in the middle of the display when the phone is held vertically. From that, an approximate distance and angle to the average user's mouth can be concluded. Note that "vertically" here means relative to a user's head and not to the ground. FIG. 22 shows how high sensitive touch sensor sees the ear in the middle of the display when the phone is held in a 45 degrees position (illustrated in FIG. 15). From that, an approximate distance and angle to the average user's mouth can be concluded. Note that "45 degrees" here means relative to a user's head and not to the ground. FIG. 23A shows how high sensitive touch sensor sees the ear in the top of the display when the phone is held vertically (illustrated in FIG. 23B). From that an approximate distance and angle to the average user's mouth can be concluded. FIG. 24A shows how high sensitive touch sensor sees the ear in the middle of the display when the phone is held horizontally (illustrated in FIG. 24B). From that, an approximate distance and angle to the average user's mouth can be concluded. Note that "horizontally" here means relative to a user's head and not to the ground.

FIGS. 25A-28A show how the touch sensor detects the ear in the top of the display when the phone is held in the 45 degrees position (see FIG. 15), but the angle against the user's cheek is increased (illustrated in FIGS. 25B-28B respectively). The ear and the cheek touch can be detected and, from that, an approximate distance and angle to the average user's mouth can be concluded. The ear position can be quite well detected using the touch sensor especially if most of the ear is covered by the touch sensitive area of the phone.

In a case where only a minority of the ear is covered by the touch sensitive area of the phone, detecting the cheek in addition to the ear can be used too. See FIGS. 25A and 25B where the bottom part of the ear is visible in the top area of the touch sensor and the cheek from another shape. This pattern of ear and cheek is recognizable even if the ear alone would be mostly outside the touch area.

The algorithm that calculates the ear position can reside on the host processor or it can be also part of the touch sensor subsystem that does all the math and only indicates the location of for example the ear hole. The example images in the drawings are not even done using the latest technology available, and the newer touch sensors are even more sensitive and accurate.

Features as described herein may be used to optimizing uplink audio tunings in telephony, such as from a microphone in a mobile telephone handset for example, based at least partially on a position of the apparatus that is recognized using a sensor, such as touchscreen touch sensor for example. Uplink audio tunings may be optimized for a certain position or subset of positions of the mobile telephone handset relative to a portion(s) of a user's head. However, the way the mobile telephone handset is held by various users may vary quite a lot and, the farther away from an optimal position of the mobile telephone handset, the worse the telephony uplink audio quality. Features as described herein may utilize sensory data (for example a display screen touch sensor) to define how a user holds the mobile telephone handset relative to the user's mouth, and use different audio uplink tunings depending on that information. An advantage is better telephony audio uplink quality.

Figure 29:
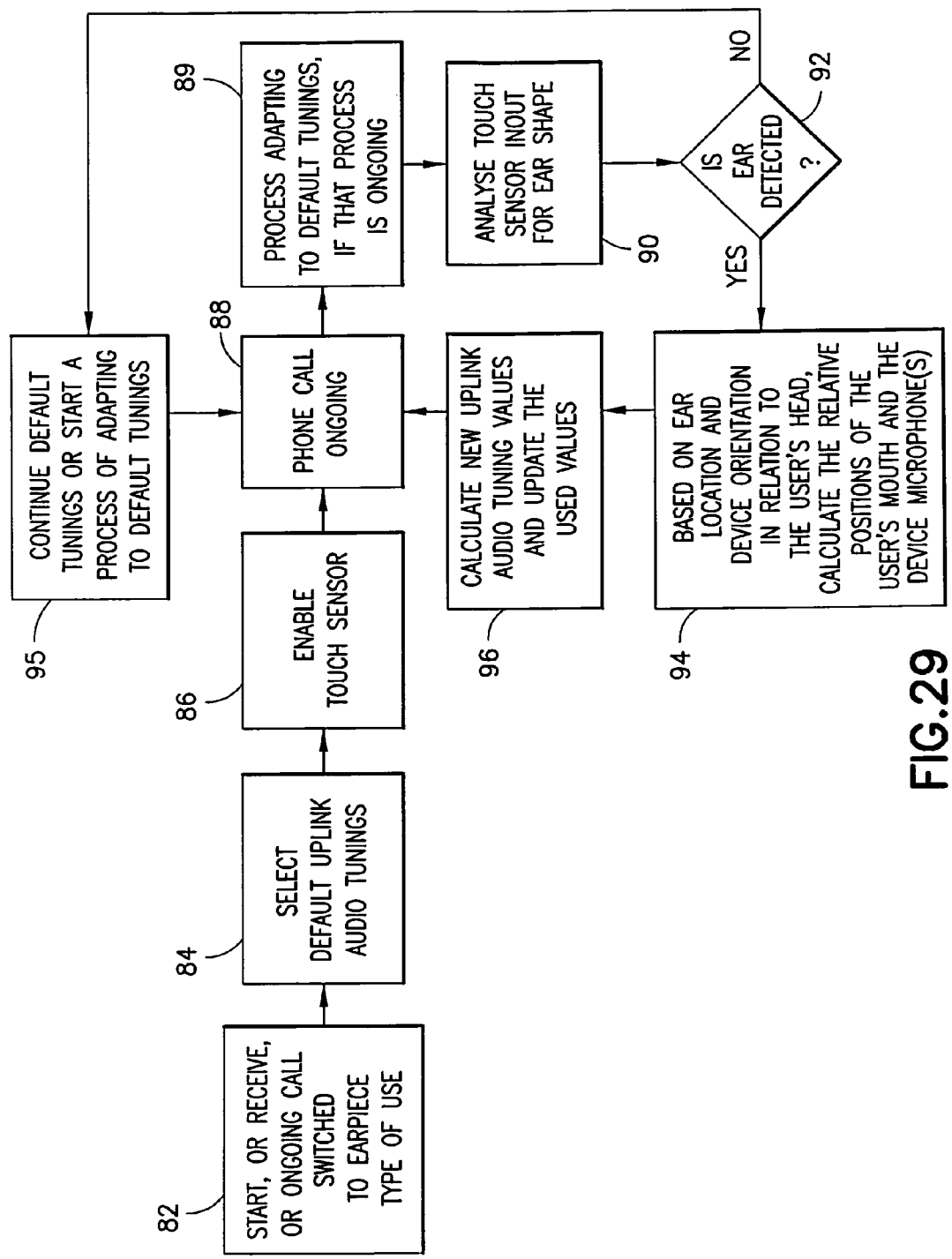
FIG. 29 is a flow diagram of one example method.

As noted above, features may be embodied in a Continuous algorithm or a Mode Based algorithm. FIG. 29 shows an example of features of a Continuous algorithm. In this example when call is started, or received or switched to an earpiece type of use as indicated by block 82, the apparatus 10 may select 84 default uplink audio tuning parameters. The touch sensor 36 is enabled 86, and with the ongoing phone call in an earpiece type of use as indicated by block 88 (when phone is normally held to the user's head) if the audio tunings go to the default state from 95, the process of adapting to the default tunings may occur as indicated by 89. The apparatus analyzes 90 output from the sensor 36 for a shape of at least one portion of the user's head, such as an ear for example. If the portion(s) of the user's head is detected 92, then the relative position of the microphone 32 to the user's mouth is calculated or determined 94. The apparatus may then calculate 96 new uplink audio tuning values and update the used values. If the portion(s) of the user's head is not detected at 92, then the method may return to 88 and the default tunings may be applied or continue as indicated by block 95.

Figure 30:
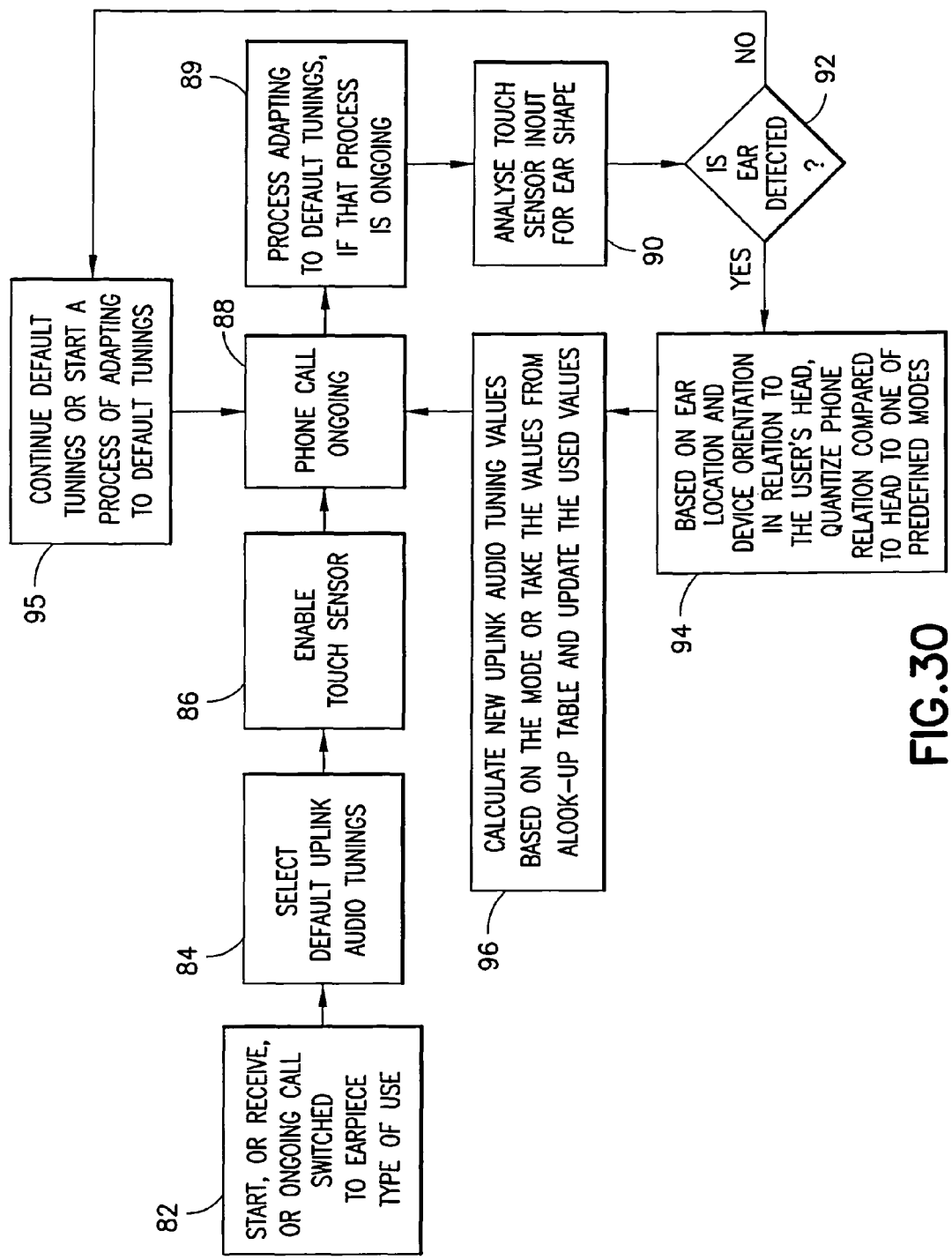
FIG. 30 is a flow diagram of one example method.

FIG. 30 shows an example of features of a Mode Based algorithm. In this example when call is started, or received or switched to an earpiece type of use as indicated by block 82, the apparatus 10 may select 84 a default uplink audio tuning parameters. The touch sensor 36 is enabled 86, and with the ongoing phone call in an earpiece type of use as indicated by block 88 (when phone is normally held to the user's head) if the audio tunings go to the default state from 95, the process of adapting to the default tunings may occur as indicated by 89. The apparatus analyzes 90 output from the sensor 36 for a shape of at least one portion of the user's head, such as an ear for example. If the portion(s) of the user's head is detected 92, then based on the ear location and device orientation in relation to the user's head, the apparatus may quantize 98 the phone relation compared to the head to one of predefined modes. The apparatus may then calculate 100 new uplink audio tuning values based on the mode or take the values from a look-up table and update the used values. If the portion(s) of the user's head is not detected at 92, then the method may return to 88 and the default tunings may be applied or continue as indicated by block 95. It should be noted that these are merely examples. Any suitable series of method steps could be used.

Some conventional mobile handsets suffer from uplink speech quality problems, such as if the user holds the phone in a position that leads to a decreasing signal level on the primary microphone. A noise cancellation algorithm may try to remove the background noise from the uplink speech signal, and relies somewhat on the relative signal levels between the microphones. Normally, the level on the primary microphone (close to the user's mouth) is higher than on the secondary microphone (usually somewhere on the top part of the device), but as the level difference in the primary and secondary microphones gets smaller, the algorithm gets confused, and starts to cancel the actual speech signal. Features as described herein may apply the knowledge on the device location (such as by boosting the primary microphone signal for example), when the device is in a compromised position and orientation, or by switching the algorithm into a different mode altogether.

Figure 31:
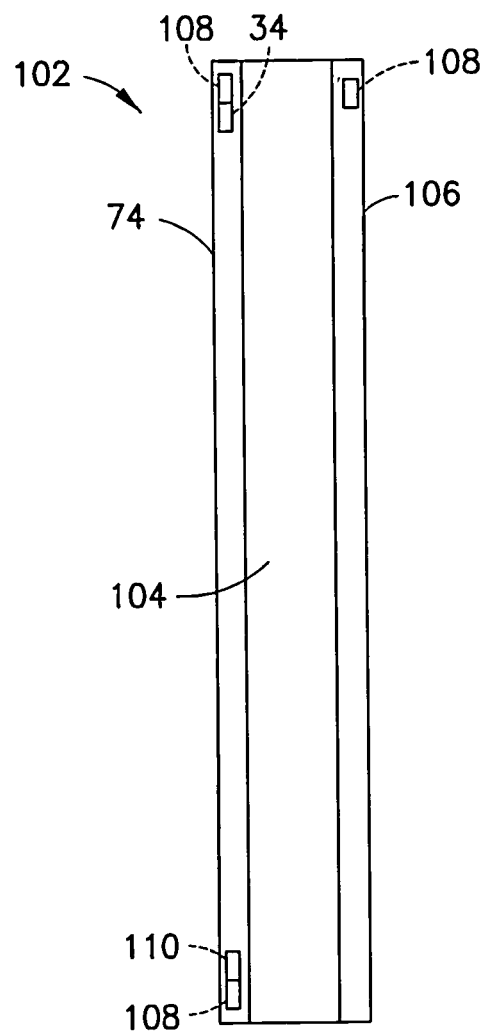
FIG. 31 is a schematic diagram of an alternate example embodiment.

Referring also to FIG. 31, in this example the apparatus 102 comprises a display 74 on a front side, a main body 104 having electronics therein, and a back side 106 of the housing. The apparatus does not have the vibrating element 72. Thus, the display 74 is not part of a panel speaker. Instead, the apparatus 102 has a conventional sound transducer earpiece 34. The user can place his/her ear at least partially against the display 74 with the display acting as an ear sensor. In one example embodiment, having a display is not actually necessary. For example, in one type of example embodiment features may be used without using the display or a device which does not actually have a display. It is possible to use the above described functionality so that there is ear detection, but not necessarily ear detection at the display, such as a touch sensor at the back cover for example. As example, an alternative or additional sensor 36 might be one or more cameras 108. One or more front cameras can be used for this purpose. The camera sensor(s) could be used alone or in conjunction with the display sensor(s) to sense the location of the apparatus 102 relative to the user's ear and/or other portion of the user's head, such as relative to the user's mouth. If the front camera(s) is in the bottom part of the device (instead of the top part where it typically is), the front camera or multiple front cameras could be used to detect a distance or proximity of the mouth, or ear, or other portion of the user's head, relative to the apparatus 102. An additional or alternative detector(s) 110 may be provided. The detector 110 may be a proximity detector, or camera, or other detector such as using ultrasound or another microphone for example to sense the location of the user's mouth or nose or cheek. For using ultrasound, for example:

Play ultrasound from the device's loudspeaker and measure the response using one or more microphones Play ultrasound from an additional loudspeaker suitably located in the device and measure the response using one or more microphones Play ultrasound using the display panel speaker and measure the response using one or more microphones The microphones within the context may be the one(s) used for telephony and/or audio recording, or discrete microphones for this purpose only, or a mixture of these for example.

If there is an additional proximity sensor in the bottom part of the device, it can measure the distance of the cheek/jaw from the device's bottom and audio tuning can be adjusted based on that. The touch based system can be used to calculate three parameters, but proxy based only one. In case there are multiple proximity sensors in the bottom, then the shape of the face can be detected more accurately. Use of a camera is mentioned as well. The front camera can be used to a certain extent, but if there is additional front camera in the bottom, it can "see" the mouth quite well and in case there is stereo front camera in the device bottom, it can measure also the distance.

In one example embodiment an apparatus comprises at least one sensor configured to sense location of at least one portion of a head of a user relative to the apparatus; at least one processor; and at least one memory comprising software, where the at least one processor and the software are configured to process audio signals based, at least partially, upon output from the at least one sensor. The audio signals may be, for example, signals from one or more microphones created from acoustic signals received by the microphone(s) while a person is in a speech communication. The apparatus may be configured to process the audio signals by updating one or more audio signal parameters associated with the uplink audio based upon sensed location of the device relative to the head (for example, for extreme positions shown in FIGS. 23B and 28B). The one or more audio signal parameters can be part of any of the audio algorithms provided in the signal processor. It is understood that the audio signals form the uplink audio being transmitted to the far-end during a speech communication.

The at least one sensor may comprise a sensor at an electronic display of the apparatus. The at least one sensor may comprise a capacitive touch sensor. The at least one sensor may comprise at least one camera. The at least one sensor may comprise a sensor in a speaker. The at least one sensor may comprise a proximity sensor configured to sense location of a mouth of the user relative to the apparatus. The apparatus may be configured to apply an equalization to the audio signals. The apparatus may be configured to determine location of the apparatus relative to a mouth of a user. The apparatus may be configured to determine at least one of: an angle of the apparatus relative to a line between the mouth of the user and an ear of the user, a distance of the apparatus from the mouth, an angle of the device relative to a cheek of the user. The apparatus may be configured to determine orientation of an earlobe of the user relative to the apparatus. The apparatus may be configured to determine location of a cheek of the user relative to the apparatus. The apparatus may be a mobile communication device comprising electronic circuitry including at least one printed circuit board comprising a transmitter, a receiver, at least one processor and at least one memory having software, and an electronic display connected to the at least one printed circuit board. The at least one sensor 36 may comprise at least one of a capacitive touch sensor, an accelerometer, and a gyroscope. The at least one sensor 36 may comprise at least one of at least one camera, and at least one sensor in a speaker. The at least one sensor 36 may be configured to sense location of at least two portions of the head of the user comprising at least one of an ear, a cheek and a mouth. The apparatus may be configured to process the audio signals by applying at least one different audio uplink tuning based upon the output from the at least one sensor. The apparatus may be configured to apply an equalization to the audio signals as the at least one different audio uplink tuning comprising a frequency response being at least partially adjusted based on a location determination.

An example method comprises sensing, by at least one sensor, location of an apparatus relative to at least one portion of a head of a user relative to the apparatus; and processing an input audio signal based, at least partially, upon the location sensed by the at least one sensor.

The sensing may comprise sensing location of at least one of: an ear of the user, a cheek of the user, a mouth of the user. The method may further comprise determining at least one of: an angle of the apparatus relative to a line between a mouth of the user and an ear of the user, a distance of the apparatus from the mouth, an angle of the device relative to a cheek of the user. Processing of the audio signal may comprise applying an equalization to the audio signals. Processing the audio signal may comprise applying an equalization to the audio signals when the location sensed by the at least one sensor is at least one of: more than a predetermined angle of the apparatus relative to a line between a mouth of the user and an ear of the user, more than a predetermined distance of the apparatus from the mouth, more than a predetermined angle of the device relative to a cheek of the user.

In another example embodiment a non-transitory program storage device readable by a machine is provided such as memory 24 for example, tangibly embodying a program of instructions executable by the machine for performing operations, the operations comprising: determining location of at least one portion of a head of a user relative to an apparatus based upon output from at least one sensor; and processing an audio signal based, at least partially, upon the determined location.

Processing the audio signal may comprise applying an equalization to the audio signals when the determined location is at least one of: more than a predetermined angle of the apparatus relative to a line between a mouth of the user and an ear of the user, more than a predetermined distance of the apparatus from the mouth, more than a predetermined angle of the device relative to a cheek of the user.

With features as described herein, based upon a sensed position of an apparatus relative to a head of a user, the apparatus may adjust audio uplink tuning if the sensed position is determined to be a predetermined position which, if audio uplink tuning is not adjusted, may otherwise result in attenuating or clipping of some of the audio signal. Audio uplink tuning does not need to be adjusted for all sensed position. Instead, audio uplink tuning adjustment may be limited to a limited number or range of relative positions of the apparatus to the user's head (as sensed by the sensor(s)). Additional parameters may also be used to adjust the uplink audio tuning in addition to the sensed position, such as sensed volume incoming into the microphone for example, or a user selected setting for example. The apparatus may be configured to perform one or more predetermined functions based upon the sensed position of the apparatus relative to the portion(s) of the user's head such as applying equalization or adjusting equalization to different settings, or signaling the user to adjust the location of the apparatus 10 relative to the portion(s). Signaling may be accomplished, for example, by using the piezo to vibrate the display as a tactile feedback signaling to the user to move the apparatus to a better position for better acoustic pickup by the microphone.

It should be understood that the foregoing description is only illustrative. Various alternatives and modifications can be devised by those skilled in the art. For example, features recited in the various dependent claims could be combined with each other in any suitable combination(s). In addition, features from different embodiments described above could be selectively combined into a new embodiment. Accordingly, the description is intended to embrace all such alternatives, modifications and variances which fall within the scope of the appended claims.

What is claimed is:

1. An apparatus comprising:
   at least one sensor;
   at least one processor; and
   at least one memory comprising software,
   where the at least one processor and the software are configured to:
      analyzing output from the at least one sensor to identify at least a part of an earlobe of a user;
      determine, based at least partially upon a location of the identified at least part of the earlobe of the user relative to the apparatus, if at least one audio uplink tuning parameter is to be updated;
      determine, based on the location of the identified at least part of the earlobe of the user and an orientation determination of the apparatus relative to a head of the user, a new value for the at least one audio uplink tuning parameter; and
      process uplink audio signals based on the new value for the at least one audio uplink tuning parameter.

2. An apparatus as in claim 1 where the at least one sensor comprises a sensor at an electronic display of the apparatus.

3. An apparatus as in claim 1 where the at least one sensor comprises at least one of:
   a capacitive touch sensor,
   an accelerometer, and
   a gyroscope.

4. An apparatus as in claim 1 where the at least one sensor comprises at least one of:
   at least one camera, and
   at least one sensor in a speaker.

5. An apparatus as in claim 1 where the at least one processor and the software are further configured to analyze the output from the at least one sensor to identify a location of at least one of:
   an ear of the user relative to the apparatus;
   a cheek of the user relative to the apparatus, and
   a mouth of the user relative to the apparatus.

6. An apparatus as in claim 1 where the apparatus is configured to apply an equalization to the uplink audio signals as the at least one audio uplink tuning parameter comprising a frequency response being at least partially adjusted based on the orientation determination.

7. An apparatus as in claim 5 where the apparatus is configured to determine at least one of:

an angle of the apparatus relative to a line between the mouth of the user and the ear of the user,
a distance of the apparatus from the mouth,
an angle of the device relative to the cheek of the user.

8. An apparatus as in claim 1 where the apparatus is configured to determine orientation of the identified at least part of the earlobe of the user relative to the apparatus.

9. An apparatus as in claim 1 where the apparatus is a mobile communication device comprising electronic circuitry including at least one printed circuit board comprising a transmitter, a receiver, the at least one processor and the at least one memory having software, and an electronic display connected to the at least one printed circuit board.

10. A method comprising:
analyzing by a processor output from at least one sensor of an apparatus to identify at least a part of an earlobe of a user;
determining by the processor a location of an apparatus relative to the identified at least part of the earlobe of the user relative to the apparatus;
determining by the processor, based at least partially upon the determined location of the identified at least part of the earlobe of the user, if at least one audio uplink tuning parameter is to be updated;
determining by the processor, based on the determined location of the identified at least part of the earlobe of the user and an orientation determination of the apparatus relative to a head of the user, a new value for the at least one audio uplink tuning parameter; and
processing an uplink audio signal based on the new value for the at least one different audio uplink tuning parameter.

11. A method as in claim 10 where the method further comprises determining a location of at least one of:
an ear of the user;
a cheek of the user, and
a mouth of the user.

12. A method as in claim 11 further comprising determining at least one of:
an angle of the apparatus relative to a line between the mouth of the user and the ear of the user,
a distance of the apparatus from the mouth, and
an angle of the device relative to the cheek of the user.

13. A method as in claim 11 where processing the uplink audio signal comprises applying an equalization to the uplink audio signals when the location sensed by the at least one sensor is at least one of:
more than a predetermined angle of the apparatus relative to a line between the mouth of the user and the ear of the user,
more than a predetermined distance of the apparatus from the mouth of the user,
more than a predetermined angle of the device relative to the cheek of the user.

14. A non-transitory program storage device readable by a machine, tangibly embodying a program of instructions executable by the machine for performing operations, the operations comprising:
analyzing by a processor output from at least one sensor of an apparatus to identify at least a part of an earlobe of a user;
determining by the processor a location of the identified earlobe of the user relative to an apparatus;
determining by the processor, based at least partially upon the location of the identified part of the earlobe of the user, if at least one audio uplink tuning parameter is to be updated;
determining by the processor, based on the location of the identified part of the earlobe of the user and an orientation determination of the apparatus relative to a head of the user, a new value for the at least one audio uplink tuning parameter; and
processing an audio uplink signal based on the new value of the at least one audio uplink tuning parameter.

15. A non-transitory program storage device as in claim 14 where processing the uplink audio signal comprises applying an equalization to the uplink audio signals when the determined location is at least one of:
more than a predetermined angle of the apparatus relative to a line between a mouth of the user and an ear of the user,
more than a predetermined distance of the apparatus from the mouth,
more than a predetermined angle of the device relative to a cheek of the user.

16. An apparatus as in claim 1 where the uplink audio signals are uplink audio signals from a microphone of the apparatus.

17. An apparatus as in claim 16 where determining the orientation of the at least part of the earlobe is based upon at least one of the shape of the earlobe and location of an ear canal of the user.

18. A method as in claim 10 where the method further comprises determining orientation of the earlobe of the user relative to the apparatus.

19. A method as in claim 10 where the uplink audio signals are uplink audio signals from a microphone.

20. An apparatus as in claim 17 wherein determining the orientation of the at least part of the earlobe is based upon at least one of the shape of the earlobe and the location of the ear canal.

21. An apparatus as in claim 1 wherein determining if at least one different audio uplink tuning parameter is to be updated comprises determining if the analysis of the output from the at least one sensor to identify at least the part of the earlobe of the user exceeds a threshold reliability value.

22. An apparatus as in claim 21 wherein for the case the threshold reliability value is not exceeded, the selecting comprises selecting a default audio uplink tuning parameter as the at least different one audio uplink tuning parameter.

23. An apparatus as in claim 1 wherein the at least one processor and the software are configured to signal the user to move the apparatus to a different location so as to improve audio uplink signal quality based upon the orientation determination of the apparatus relative to the head of the user.

* * * * *